Sept. 19, 1944.　　C. H. NORDELL　　2,358,655
SCREEN
Filed Feb. 6, 1943　　2 Sheets-Sheet 1
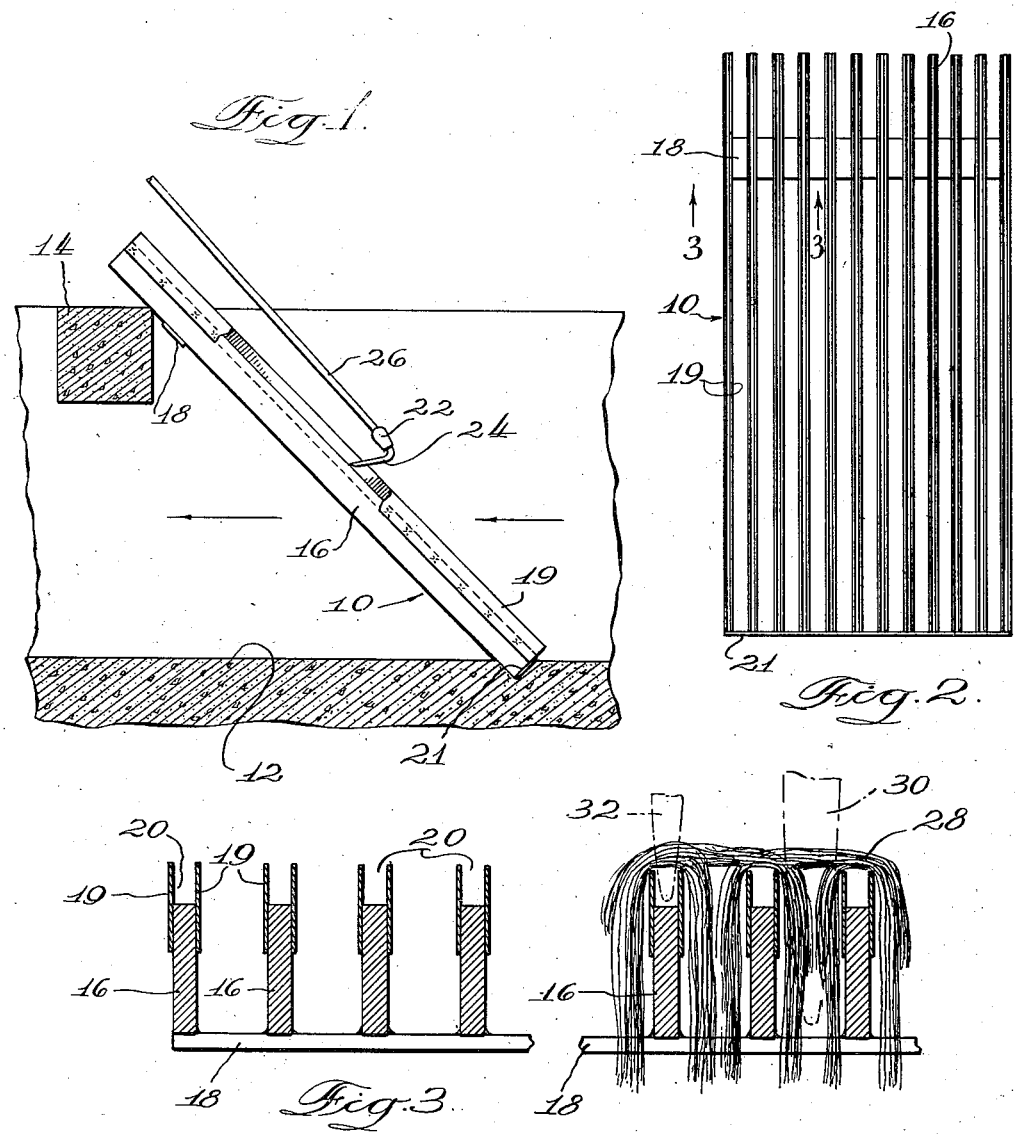

Sept. 19, 1944. C. H. NORDELL 2,358,655
SCREEN
Filed Feb. 6, 1943 2 Sheets-Sheet 2
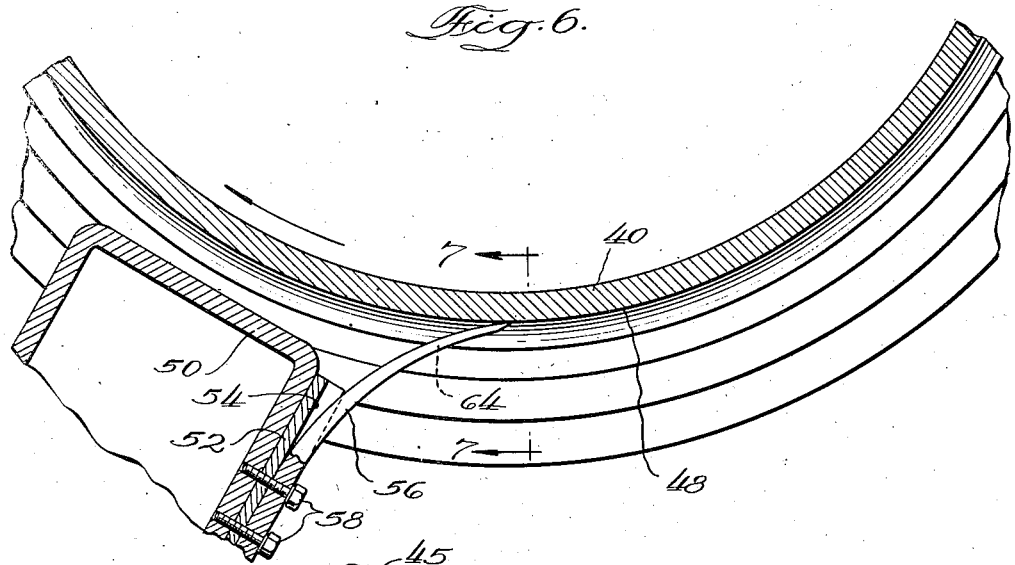
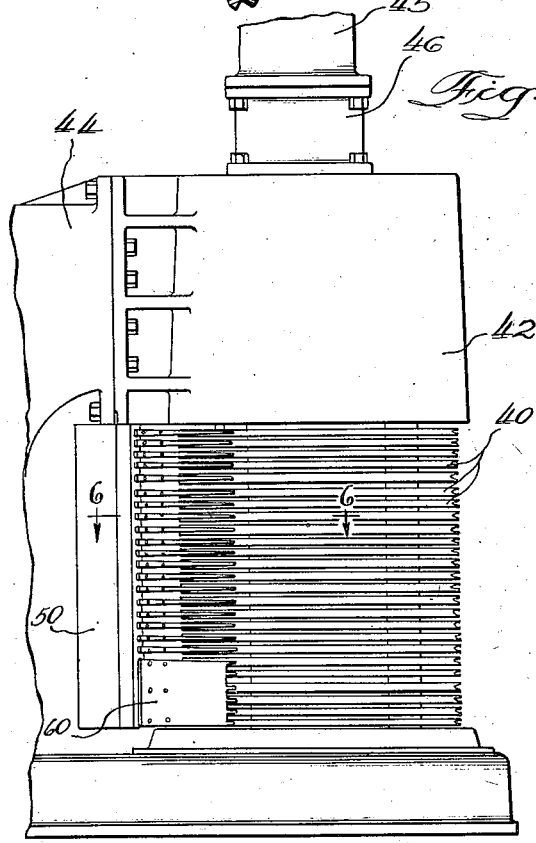
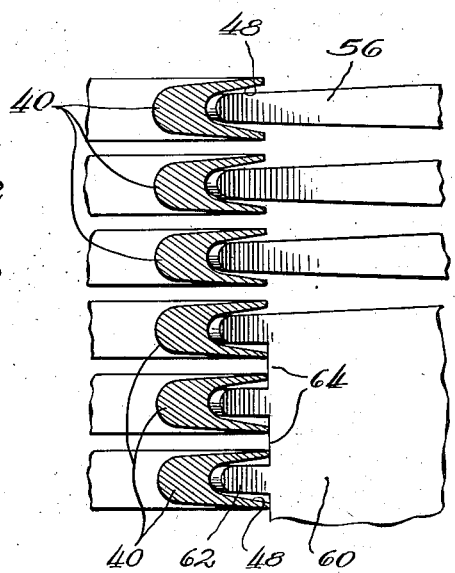
Inventor.
Carl H. Nordell
By Williams, Bradbury & Hinkle
Attorneys.

Patented Sept. 19, 1944

2,358,655

UNITED STATES PATENT OFFICE 2,358,655

SCREEN

Carl H. Nordell, Coloma, Mich.

Application February 6, 1943, Serial No. 474,958

5 Claims. (Cl. 210—176)

My invention relates generally to screens, and more particularly to bar screens, rotary screens, and the like.

In many hydraulic systems, such as in sewage treatment plants, irrigation and drainage ditches, hydroelectric plants and the like, it is necessary or desirable to remove from the hydraulic medium large foreign matter, debris, driftwood, rags, and similar matter, which would otherwise interfere with the proper operation of the system. It is customary in many of such systems to utilize bar screens which comprise merely a series of closely spaced parallel rectangular bars, usually arranged at an angle to the direction of flow of the hydraulic medium and thus arranged to separate therefrom the aforementioned foreign matter above a predetermined permitted size.

Particularly in sewage treatment plants, much of this debris carried by the sewage consists of material of a fibrous nature, such as rags, paper, and the like, the ends of which flow through the spaces between the bars and are thus arrested by the bars and clog the screen. It is customary to remove such matter arrested by the bar screen by means of a rake device, either manually- or power-operated, the tines of which pass between the bars and are drawn longitudinally of the bars to drag the arrested material from the bar screen.

It is an object of my invention to provide an improved screen of the bar or rotary type which is constructed to facilitate the removal of such arrested material by means of a rake device.

A further object is to provide an improved bar screen and an improved rake device therefor whereby the removal of matter arrested by the bar or rotary screen is facilitated.

Other objects will appear from the following description, reference being had to the accompanying drawings, in which:

Fig. 1 is a longitudinal sectional view of a hydraulic conduit showing a bar screen in side elevation, a portion of one bar of the screen being broken away to show a rake device;

Fig. 2 is a plan view of the bar screen shown in Fig. 1;

Fig. 3 is a fragmentary sectional view of the screen taken on the line 3—3 of Fig. 2;

Fig. 4 is a view similar to Fig. 3 illustrating the manner of operation of raking the screen;

Fig. 5 is a side elevational view of a rotary screen incorporating the invention;

Fig. 6 is a horizontal sectional view taken on the line 6—6 of Fig. 5; and,

Fig. 7 is a vertical sectional view taken on the line 7—7 of Fig. 6.

Referring to Fig. 1, a bar screen 10 is illustrated as being located in an open conduit or channel 12 having a cross beam 14. The bar screen comprises a plurality of heavy bars 16 which are secured in suitably spaced parallel relation upon a tie strip 18 and a bar 21, as by welding. As best shown in Fig. 3, each of the bars 16 has a pair of sheet metal strips 19 welded to the sides thereof at the upper edge, to form a channel or trough 20. A rake 22 comprising a plurality of tines 24 and an operating rod or handle 26 is shown in Fig. 1 in the position in which it is used to rake from the screen the material arrested thereby.

It will be noted that the tines 24 are of the same spacing as the bars 16 so that the tines project into and are guided by the channels 20 formed by the strips 18.

As shown in Fig. 4, much of the matter and debris arrested by the screen includes fibrous or stringy material 28, the ends of which are frequently drawn by the flow of the hydraulic fluid through the spaces between the bars 16. In the past, it was common to utilize a rake having tines which were spaced so as to project into the spaces between the bars of the screen, in the manner as illustrated generally by the tine 30 shown in dotted lines in Fig. 4.

When a screen became partially clogged with fibrous material, such as the material 28 shown in Fig. 4, and it was endeavored to rake this material from the screen, the tines packed the material ahead of them and tended to become wedged between the bars of the screen by this material, with the result that it was difficult to pull the rake along the screen manually, or in case the rake device was operated by power, a motor of excessive size was required to insure against stalling thereof when the tines of the rake were thus wedged between the bars of the screen by such fibrous matter.

The mechanism for operating the rake had also to be made relatively heavy and the power consumption for the operation of the raking device was relatively great because of the added friction resisting drawing of the tines of the rake or rakes along the bar screen, the friction being due to the above mentioned wedging action of the matter arrested by the screen.

However, with the use of the bar screen of the present invention, in which each of the bars is provided with a groove or channel along its upstream edge, the tine, such as the tine 32 shown in dotted lines in Fig. 4, may have its end project into the groove, and the point of the tine thus lies beneath any fibrous matter which may be draped around one or more of the bars. Such fibrous matter will not enter the grooves 20 formed in the edges of the bars of the screen because the flow of the water between the bars of this screen will tend to drape such matter in the general manner indicated in Fig. 4, and the string or cloth will thus contact only with the upper edges of the strips 18 and will bridge across the grooves.

Because of this arrangement, the rake may be easily pulled along the bar screen to remove such fibrous matter therefrom. In an apparatus in which the bar screen is automatically cleaned by a power-operated rake device, the latter may be made of lighter and less strong materials, and operated by a less powerful motor than would be required if the tines of the rake device were to be pulled through the spaces between the bars of the screen.

The invention may also be embodied in a rotary screen of the type shown in Figs. 5, 6, and 7. In this embodiment of the invention, the screen is provided by a plurality of flat rings 40 which are suitably secured together and mounted for rotation in a housing and bearing member 42 secured to a suitable support 44. The rings 40 are rotated by a motor 45 through a suitable speed-reducing gear train contained in a housing 46.

Each of the screen rings 40, as best shown in Figs. 6 and 7, has a groove or channel 48 formed in its peripheral edge. A box channel 50 has a plate 52 secured thereto, the plate 52 having suitable transverse slots 54 for locating the prongs 56 which are secured in place by cap screws 58. The prongs 56 are preferably curved, as shown in Fig. 6, and the ends thereof project into the grooves 48 formed in the rings 40, as shown in Figs. 6 and 7.

Depending upon the character of the material being screened, it may be desirable to have a plurality of prongs formed integrally from a single sheet, as best shown in Fig. 7, wherein a sheet 60, which is suitably secured to the channel 50, has a plurality of short teeth projecting into the grooves 48 of the adjacent rings 40. The portions 64 of the plate 60 between the teeth 62 are preferably formed to substantially scrape the extreme edges of the rings 40 so as to keep these edges free from accumulations of such material as would otherwise tend to adhere thereto.

In the constructions shown in Figs. 5, 6, and 7, the rings 40 may be made of cast iron or the like, with the grooves initially cast therein, and in other instances, the rings 40 may have the grooves 48 formed therein by a machining operation. In the embodiment of Fig. 7, the fact that the prongs 56 and teeth 62 project into the grooves of the rings of the screen, makes it possible to operate the apparatus with a minimum consumption of power since there is no possibility of the application of excessive friction due to the wedging action of the prongs previously described above with reference to Fig. 4.

While I have shown and described particular embodiments of my invention, it will be apparent to those skilled in the art that the underlying principles thereof may be embodied in many other forms, and I therefore desire, by the following claims, to include within the scope of my invention, all such variations and modifications whereby substantially the results of the invention may be obtained by substantially the same or equivalent means.

I claim:

1. A bar screen comprising a plurality of parallel spaced bars in which each of the bars is formed with a groove or channel in the upstream facing edge thereof.

2. In a bar screen, the combination of a plurality of spaced parallel bars secured together to form a screen, and a pair of strips rigidly secured to each of said bars to form a rake tine receiving channel along its upstream facing edge.

3. In a rotary screen apparatus having a screen comprising a plurality of spaced rings, each of said rings having a groove formed in its peripheral edge, means for removing material which has been arrested by the screen comprising a plurality of prongs having their ends projecting into the grooves of said rings, and means to relatively rotate said screen and said material removing means, whereby fibrous material extending across said grooves may be readily removed therefrom.

4. In a rotary screen apparatus having a screen comprising a plurality of spaced rings, each of said rings having a groove formed in its peripheral edge, means for removing material which has been arrested by the screen comprising a plate provided with a plurality of prongs having their ends projecting into the grooves of said rings and the edge of the plate intermediate the prongs substantially scraping the peripheral edges of said rings, and means for relatively rotating said screen and said material removing means, whereby fibrous material extending across said grooves may be readily scraped therefrom.

5. In combination, a screen comprising a plurality of spaced bars each having a groove formed in its upstream edge, and rake device comprising a plate having tines spaced and shaped to project into the grooves of said bars and having its edge between the tines conformed to scrape the upstream edges of said bars.

CARL H. NORDELL.